C. K. HANN.
MEANS FOR RAISING AND LOWERING AUTOMOBILE TOPS.
APPLICATION FILED DEC. 24, 1910.
1,071,914.
Patented Sept. 2, 1913.
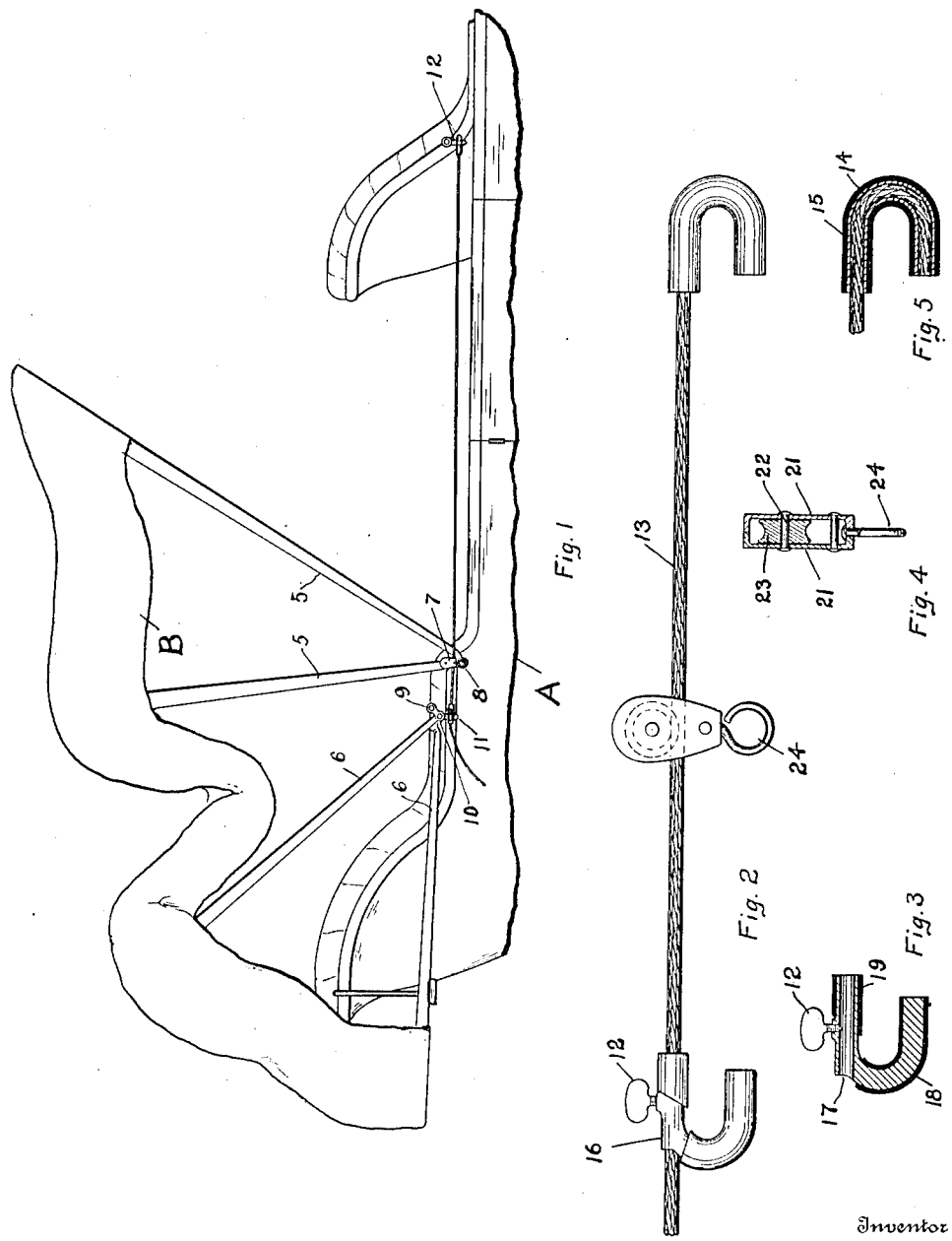

UNITED STATES PATENT OFFICE.

CHESTER K. HANN, OF COLUMBUS, OHIO.

MEANS FOR RAISING AND LOWERING AUTOMOBILE-TOPS.

1,071,914. Specification of Letters Patent. Patented Sept. 2, 1913.

Application filed December 24, 1910. Serial No. 599,230.

*To all whom it may concern:*

Be it known that I, CHESTER K. HANN, a citizen of the United States, residing at Columbus, in the county of Franklin and State of Ohio, have invented certain new and useful Improvements in Means for Raising and Lowering Automobile-Tops, of which the following is a specification.

This invention relates to certain novel and useful improvements in means for raising and lowering the tops of automobiles and other vehicles.

In carrying out my invention, it is my purpose to provide an improved means whereby the heavy, cumbersome tops of large vehicles, such as automobiles, and especially that type of automobile commonly known as touring cars, may be rapidly and easily raised and lowered by one person.

It is usually the practice in raising and lowering the large top of an automobile, for two persons to engage in the work, one at each side of the machine, for, when the bows have been loosened, the top, which is relatively heavy, cumbersome and inconvenient to handle is liable to sag and scratch the body of the car. Consequently, as before stated, ordinarily two persons handle the top in raising and lowering the same.

I aim, in the present instance, to provide a simple, inexpensive and convenient means adapted to be attached to the body of a vehicle whereby such top may be raised and lowered without assistance by one person, and without the liability of the top sagging or dropping and the parts of the frame, such as the bows or the like, scratching the body or otherwise injuring the body of the car.

With the above recited objects and others of a similar nature in view, my invention consists in the construction, combination and arrangement of parts set forth in and falling within scope of the appended claims.

In the accompanying drawings—Figure 1 is a partial view in side elevation of an automobile body, showing the top in partially raised or lowered position and equipped with my invention, Fig. 2 is a view in side elevation of my improved means for raising and lowering the top, Fig. 3 is a longitudinal sectional view taken through an adjustable hook of my device. Fig. 4 is a vertical sectional view through the trolley or sheave, and Fig. 5 is a longitudinal sectional view through a hook which is permanently attached to one end of the cable.

Referring now to the accompanying drawings in detail, the letter A designates a portion of the body of the car which is herein conveniently illustrated, said body being provided with the usual top designated as an entirety by the numeral B, said top comprising the forward bows 5 and the rear bows 6. As is generally known, the forward bows comprise two members and as usual, are joined as at 7 at their lower ends and are provided with the laterally extending pin 8. In practice, when the top is folded together, it is usual to insert this pin 8 in the eye 9 of the pivot bracket 10 of the rear bow, said pivot bracket having a hooked or other extension 11 as is shown in Fig. 1. When, however, the top is brought forward or extended, the pin 8 of the front bows is dropped into a hook or the like 12 fastened forward of the body of the vehicle.

In carrying out my invention, I provide a construction such as is shown in Fig. 2, comprising a wire cable or the like, indicated at 13, having permanently attached to one end thereof a hook comprising a metallic body 14, covered with rubber or other suitable material as at 15. Said cable is also formed with an adjustable hook 16 of brass or other suitable metal, having a bore 17 through which passes the cable, said hook being also provided with sleeves or coverings 18 and 19 of rubber or fabric. At 20 I have shown a set screw, through the medium of which the hook may be adjustably fastened at any place along the cable. Movably mounted on the cable between the two hooks is a sheave block or trolley comprising the face plates 21 carrying the axle 22, upon which is rotatably mounted a grooved wheel 23, while 24 indicates a depending ring carried by the block.

The above is a description of my device, and in employing the same, one of the hooks, for instance the permanent hook, is connected to the ring or hook 12 at the front of the vehicle, while the hook at the opposite end of the cable is connected with the bracket 11 and adjusted so as to bring the line taut. If it be desired to raise or extend the top, the pin 8 is pulled from the eye 9 of the bracket of the rear bows and slipped into the ring 24. The operator may now go to the opposite side of the machine and push or carry the top forward, the trolley riding along the cable and supporting the top at that side out of contact with the body of the vehicle and thereby obviating the possibility of the top sagging and scratching by contact with the body of the car. When the bow has reached the forward bracket or hook, the pin may be withdrawn from the trolley and inserted into the forward fastening in the usual manner. The line or cable may then be disconnected and stowed away.

While I have herein shown but one cable in use, and while one will serve the purpose in most instances, I wish it to be understood that if desired I may employ a cable for each side of the car. It will further be seen that I have provided an exceedingly simple, cheap and convenient form of device which may be temporarily placed upon the car and then removed and stored away and it will further be seen that the means I employ will readily and efficiently support the top during the operation of raising and lowering the same.

What I claim, is—

1. In combination with a multi-seated vehicle having spaced top supporting brackets on each side, a flexible cable for spanning the distance between the front and rear seats, spaced hooks carried by said cable for embracing attachment to the brackets carried upon the same side of the vehicle, and a traveling member carried by said cable between said hooks adapted to support a portion of the top during its movement between said brackets.

2. In combination with a multi-seated vehicle having spaced top supporting brackets on each side, a flexible cable for spanning the distance between the front and rear seats, a hook for embracing attachment to one of said brackets permanently carried at one end of said cable, a complemental hook for embracing attachment to the other of said brackets upon the same side of the vehicle carried by said cable and longitudinally adjustable thereon, a traveling member carried by said cable between said hooks, and means carried by said element below said cable for supporting a portion of said top during its movement between said brackets.

In testimony whereof I affix my signature in presence of two witnesses.

CHESTER K. HANN.

Witnesses:
C. C. SHEPHERD,
INGLE A. MORRIS.

---

Copies of this patent may be obtained for five cents each, by addressing the "Commissioner of Patents, Washington, D. C."